United States Patent

Boyette et al.

[11] Patent Number: 5,527,468
[45] Date of Patent: Jun. 18, 1996

[54] NONIONIC POLYMERS FOR THE TREATMENT OF BOILER WATER

[75] Inventors: Scott M. Boyette, Wilmington, Del.; Keith A. Bair, Horsham; Fu Chen, Newtown, both of Pa.

[73] Assignee: Betz Laboratories, Inc., Trevose, Pa.

[21] Appl. No.: 359,677

[22] Filed: Dec. 20, 1994

[51] Int. Cl.$^6$ ..................................................... C02F 5/12
[52] U.S. Cl. ..................... 210/698; 134/22.19; 210/750; 252/82; 252/180; 422/16; 422/17
[58] Field of Search ..................... 210/696–701, 210/757, 750; 252/180, 181, 188.28, 82; 134/2, 3, 22.19; 422/16, 17

[56] References Cited

U.S. PATENT DOCUMENTS

| | | | |
|---|---|---|---|
| 4,443,340 | 4/1984 | May et al. | 210/697 |
| 4,659,482 | 4/1987 | Chen | 210/699 |
| 5,124,046 | 6/1992 | Sherwood et al. | 210/699 |
| 5,180,498 | 1/1993 | Chen et al. | 210/701 |
| 5,242,599 | 9/1993 | Chen et al. | 210/697 |
| 5,259,985 | 11/1993 | Nakanishi et al. | 252/180 |
| 5,271,847 | 12/1993 | Chen et al. | 210/701 |

*Primary Examiner*—Peter A. Hruskoci
*Attorney, Agent, or Firm*—Alexander D. Ricci; Richard A. Paikoff

[57] ABSTRACT

A treatment for controlling the deposition of scale imparting species on the structural surfaces of steam generating systems, wherein the aqueous medium is maintained at a pH which minimizes magnetite solubility, comprising the use of a combination of an organic amine and a nonionic polymer having the structure:

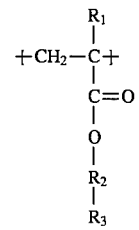

wherein $R_1$ is H or lower ($C_1$–$C_4$) alkyl, $R_2$ is $(CH_2$—$CH_2$—$O)_n$,

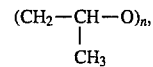

or a mixture of both, n is an integer of from 1 to about 40, and $R_3$ is H, lower ($C_1$–$C_4$) alkyl or an acetate.

14 Claims, No Drawings

NONIONIC POLYMERS FOR THE TREATMENT OF BOILER WATER

FIELD OF THE INVENTION

The present invention pertains to a treatment for controlling the formation and deposition of scale imparting compounds in steam generating systems such as boiler water systems.

BACKGROUND OF THE INVENTION

As detailed in the Betz Handbook of Industrial Water Conditioning, 8th Edition, 1980, Betz Laboratories, Inc., Trevose, Pa., pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, there is always a potential for scale formation due to residual hardness, i.e., calcium and magnesium salts. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards scale, but also water having high contents of phosphate, sulfate and silicate ions either occurring naturally or added for other purposes cause problems since calcium and magnesium and any iron or copper present, react with each and deposit as boiler scale. As is obvious, the deposition of scale on the structural parts of a steam generating system causes poorer circulation and lower heat transfer capacity, resulting accordingly in an overall loss of efficiency.

A so-called "all volatile treatment" (AVT) for boilers prevents boiler corrosion by maintaining the system pH in a recommended control range (about 8–10.5) that minimizes magnetite solubility, thus inhibiting boiler corrosion. AVT control provides minimal pH buffering and is relatively ineffective in preventing deposition of contaminants that either, enter with the system feedwater, or are produced by thermally driven changes in iron solubility in the feedwater. If strong ions such as sodium enter the system, they can concentrate under a previously formed deposit and result in under-deposit corrosion. Unlike AVT controlled programs, congruent phosphate controlled systems are designed to mitigate under-deposit corrosion by providing a concentrated under-deposit buffering system that prevents caustic or acidic corrosion. The higher volatility of organic pH control agents makes it difficult for amine or ammonia to help buffer under a deposit. For this reason, AVT control programs are monitored closely to assure, first, that an acidic or caustic ingress does not occur, and secondly, that any hardness or iron transport is minimized so that deposition and under-deposit corrosion sites are not encouraged.

Currently available boiler dispersants contain ionic groups which act to disperse particulates or modify crystal growth of undesirable boiler contaminants. These same ionic polymers are pH active and contain ionic additives that adversely affect AVT controlled boilers. The pH characteristic arises from two sources: first, the pH characteristic of the ionic group, and secondly, the salt used to neutralize these ionic groups. This pH activity makes it difficult to feed currently available polymers to AVT controlled boilers.

SUMMARY OF THE INVENTION

It has been discovered that a combination of an organic amine and a nonionic polymer is effective in controlling the formation of mineral deposits and in transporting and removing hardness found in steam generating systems such as boiler water systems, wherein the aqueous medium of such systems is maintained at a pH which minimizes magnetite solubility.

The nonionic polymers of the invention may be composed of monomers including but not limited to: hydroxypropyl (meth)acrylate, hydroxyethyl (meth)acrylate, glycerol methacrylate, vinylcatechol, vinyl-pyrrolindinone, vinylimidazole, vinylpyridine, vinyl acetate, vinyl formamide, polyethyleneglycol mono(meth)acrylate, polypropyleneglycol mono(meth) acrylate, polyethyleneglycol allyl ether, polypropyleneglycol allyl ether, allyl alcohol, allyl amine, allyloxypropanol, allyl glycerol ether, etc. These monomers may be polymerized alone or in combination with each other.

At present the nonionic polymer preferred is:

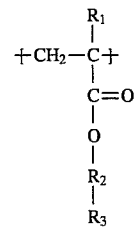

wherein $R_1$ is H or lower ($C_1$–$C_4$) alkyl,
$R_2$ is $(CH_2$—$CH_2$—$O)_n$,

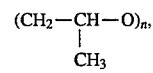

or a mixture of both, n is an integer of from about 1 to about 40, and $R_3$ is hydrogen, lower ($C_1$–$C_4$) alkyl, or an acetate.

The polymers of the present invention are neutral and contribute no direct effect on system pH. In addition, they are nonionic and do not require neutralizing additives that affect system conductivities or pH. The polymers of the present invention inhibit contaminant deposition, but do not interfere with typical AVT boiler control.

DETAILED DESCRIPTION OF THE PREFERRED EMBODIMENTS

In accordance with the invention, it has been discovered that a combination of an organic amine and a nonionic polymer is effective in controlling the formation of mineral deposits and in transporting and removing hardness ions found in steam generating systems such as boiler water systems.

The nonionic polymers of the invention may have the structure:

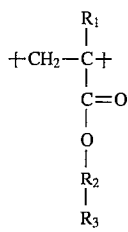

$R_1$ in Formula I is H or lower ($C_1$–$C_4$) alkyl, $R_2$ is ($CH_2$—$H_2$—O)$_n$,

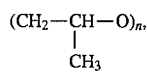

or a mixture of both, n is an integer of from about 1 to about 40, and $R_3$ is hydrogen, lower ($C_1$–$C_4$) alkyl, or an acetate formed as a cap on the polyethyleneglycol moiety by reacting an acetylating agent with a (meth)acrylate of polyethyleneglycol to produce an acetate capped polyethyleneglycol (meth)acrylate. Suitable acetylating agents include acetic acid, acetic anhydride, acetyl chloride, and the like as described in U.S. Pat. Nos. 4,959,156 and 4,487,410 fully incorporated herein by reference.

The number average molecular weight (Mn) of the nonionic polymers of Formula I is not critical and may fall within the Mn range of about 100 to 100,000 desirably, 1,000 to 30,000 and more desirably 1,500 to 10,000. The key criteria is that the polymer be nonionic.

Polyethyleneglycol monomethacrylate (HEM) is prepared by ethoxylation of methacrylate esters. These compounds are commercially available from Rhone-Poulenc under the SIPOMER® Trademark. Polyethyleneglycol monomethacrylate may also be polymerized to form a homopolymer. The polymerization may proceed in accordance with conventional solution, precipitation or emulsion polymerization techniques. Conventional polymerization initiators such as azo compounds, persulfates, peroxides, UV light, etc., may be used. Chain transfer agents such as alcohols (preferably isopropanol), amine or mercapto compounds may be used to regulate the molecular weight of the polymer. The resulting polymer may be isolated by well known techniques including precipitation, etc. If polymerized in water, the polymer may simply be used in its aqueous solution.

The treatment should be added to the boiler aqueous system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the treatment of at least one organic amine (which maintains the pH) and nonionic water soluble polymer with, e.g., nitrogen or oxygen containing functional groups, will be effective when used at levels of about 0.1–500 parts of each component per million parts of water. The treatment may be added directly into the desired water system in a fixed quantity and in the state of an aqueous solution, continuously or intermittently.

Ammonia, hydrazine or organic amines are used as all-volatile treatment boiler control agents in order to maintain feedwater, drum and steam pH. AVT controlled systems require high purity demineralized make-up water to assure that no inorganic compounds enter the boiler system where they can act as either strong acids or bases and push the system pH beyond the pH of minimum magnetite solubility. Amine concentrations are usually very small, and any acidic or basic ingress can displace the system beyond its normal control range. If these contaminants precipitate on the boiler heat transfer surfaces, they can also produce sites for under-deposit corrosion.

Maintaining the proper feedwater pH cannot prevent iron accumulation in the boiler system. As the temperature in the feedwater circuit increases, the bulk solution iron solubility decreases. The higher iron solubility in the feedwater results in precipitating iron at the lower solubility, higher temperature boiler conditions. AVT controlled programs are not designed to inhibit iron deposition on heat transfer surfaces. Deposition can reduce system thermal efficiency as well as provide sites for underdeposit corrosion.

Typical boiler polymers are ionic in nature, but not strongly acidic or basic. Even with this minimized pH character, they are capable of displacing the pH of an AVT controlled boiler program. The polymer itself does not contribute to system conductivity, a common measure used to control a system, but neutralizing salts and some polymer initiators are strongly conductive, and can contribute significantly to system conductivities.

The use of the treatments disclosed herein is not limited to steam generating or boiler systems, exclusively. For instance, they may be successfully utilized in cooling water systems, gas scrubbing systems and the like where the formation and deposition of scale forming species is a problem.

The present polymers can also be used along with chemicals that are capable of reducing dissolved oxygen in boiler water systems. The chemicals referred to as oxygen scavengers, comprise: hydrazine, hydroquinone, carbohydrazide, alkyl hydroxylamines, hydroxyalkylhydroxyl amines, citric acid, ascorbic acid, etc.

Amines such as morpholine, cyclohexylamine, piperazine, ammonia, diethylaminoethanol, dimethylisopropanolamine, dimethylamine, methoxypropylamine, ethanolamine, diethanolamine, etc., may be used alone or in blends in combination with the polymers of the invention in steam generating systems.

EXAMPLES

The invention will be further described with reference to a number of specific examples which are to be regarded solely as illustrative, and not as restricting the scope of the invention.

Example 1

Preparation of polyethyleneglycol monomethacrylate (HEM-5) homopolymer.

A suitable flask was equipped with a condenser, mechanical stirrer, septums for syringe needle, thermometer, and a nitrogen sparger. 100 grams of isopropyl alcohol (IPA) was charged to the flask. 30 grams (0.088 mole at 90%) of HEM-5 was charged to a syringe and 10.25 grams of a 2.4% solution of VAZO-52 (2,2'-azobis(2,4-dimethyl pentane nitrile) in IPA was charged to a separate syringe. The flask was heated to 70° C. with nitrogen sparging whereby the HEM-5 and VAZO-52 solutions were fed by constant speed syringe pumps over 2½ hours. The reaction mixture was held at 70° C. for 18 hours. The IPA was removed by distillation and replaced with water.

The polymer solution, after being diluted to 31% solids, had a Brookfield viscosity of 49.2 cps at 25° C. and a pH of 5.6. The structure of the polymer was verified by 13 C NMR. The spectrum was characterized by a broad polymethacrylic acid type backbone, strong resonances at 60, 69, and 71 ppm corresponding to the polyethyleneglycol moiety and a broad carbonyl region (172–178 ppm).

Example 2

Preparation of polyethyleneglycol monomethacrylate (HEM-10) homopolymer.

Utilizing the apparatus as described in Example 1, 100 grams of IPA and 0.05 grams (0.0002 mole) of VAZO-52 initiator were charged to the flask. 30 grams (0.051 mole at 90%) of HEM-10 was charged to a syringe and 10.1 grams of a 1.0% solution of VAZO-52 in IPA was charged to a separate syringe. The flask was heated to 65° C. with nitrogen sparging, whereby the HEM-10 and VAZO-52 solutions were fed by constant speed syringe pumps over three hours. The reaction mixture was held at 65° C. for two hours, whereupon, 0.25 grams of a 70% t-butyl-hydrogen peroxide was added. The reaction mix was held at constant temperature for another 16 hours. The IPA was removed by distillation and replaced with water.

The polymer solution, after being diluted to 32% solids, had a Brookfield viscosity of 49.2 cps at 25° C. and a pH of 7.1. The structure of the polymer was verified by 13 C NMR. The spectrum was characterized as described in Example 1.

Example 3

Preparation of polyethyleneglycol monomethacrylate (HEM-5) homopolymer.

Utilizing the apparatus as described in Example 1, 70.0 g of deionized water, 30 g of isopropanol and 1.3 g of sodium persulfate (SPS) were charged to the flask. 60.0 g (0.103 mol @ 90%) of HEM-5 and 12.1 g of a 17.4% aqueous SPS solution were each weighed into separate syringes of appropriate size and added to the flask over 150 minutes at 85° C. The reaction product was heated for one more hour followed by azeotropic removal of isopropanol/water. The reaction mixture was then cooled to room temperature and diluted with water to 30.1% solids. The product had a Brookfield viscosity of 22.9 cps at 25° C. The polymer was characterized by $^{13}$C NMR. The spectrum was characterized as described in Example 1.

(HEM-5 and -10 are sold by Rhone-Poulenc under the tradename SIPOMER®.)

HEM-5= polyethyleneglycol monomethacrylate, having an average of 5 moles of ethylene oxide.

HEM-10= polyethyleneglycol monomethacrylate, having an average of 10 moles of ethylene oxide.

Research Boiler Studies

Research boiler studies were performed under Amine/Polymer control. The demineralized feedwater for each boiler was checked in order to assure that the specific conductivity and silica concentrations matched those typical for AVT controlled boilers. Diethanolamine and cyclohexylamine were added to the feedwater in order to raise the pH above 9.0. Hydroquinone was added as an oxygen scavenger. Iron was fed to some boiler runs by adding iron gluconate to the feedwater. The gluconate produced lower conductivities than inorganic counter ions, and had less effect on pH control. The pH was controlled in the iron containing runs with amine, and trimmed with dilute caustic.

Boiler runs were performed at 1450 psig and 40 cycles. Each run lasted 4 days, with day 4 blowdown and steam samples used to characterize the particular run. At the end of the run, the heat transfer surface of the immersion probes was acid cleaned and sent for inorganic analysis by inductively coupled plasma—atomic emission spectroscopy. Analytical results were used to calculate a deposit weight density (DWD) for each run, and these DWDs were used to establish deposit inhibition. Results from these runs are shown in Table I.

TABLE I

| Amine/Polymer Runs (1450 psig, 40 cycles) | | | | | |
|---|---|---|---|---|---|
| | BOILER RUN | | | | |
| | Blank (with Fe) | Example 3 | Example 2 | Example 1 | Example 2 (no Fe) |
| DWD (g/ft$^2$) | | | | | |
| Top Probe | 0.766 | 0.312 | 0.486 | 0.498 | ND |
| Bottom Probe | 0.683 | 0.304 | 0.578 | 0.524 | ND |
| Average | 0.725 | 0.308 | 0.532 | 0.511 | ND |
| BD Concentrations (ppm) | | | | | |
| Cond. (uS/cm) | 141.4 | 86 | 119 | 74.2 | 19.4 |
| TOC | 37.0 | 25.0 | 40.0 | 17.1 | 23.0 |
| Acetate | 9.4 | 1.6 | 15.4 | 8.4 | 0.6 |
| Formate | 0.500 | 0.037 | 0.820 | 0.860 | 0.006 |
| Iron | 0.024 | 0.112 | 0.050 | 0.043 | <0.002 |

Con: Conductivity
TOC: Total Organics Content
ND: Not detected

Table I demonstrates that all 3 tested polymers inhibited deposition in an iron-containing Amine/Polymer controlled boiler. In addition to inhibiting deposition, the treatments also increased iron transport relative to the "blank with Fe" run. The Example 2—no Fe run shows that the polymer may be added to an Amine/Polymer controlled boiler and not upset normal control of the boiler system. These results also demonstrate that polymers can be added to Amine/Polymer controlled boilers in order to inhibit iron deposition and increase transport.

While we have shown and described herein certain embodiments of the present invention, it is intended that there be covered as well any change or modification therein which may be made without departing from the spirit and scope of the invention.

We claim:

1. In the method of controlling the deposition of scale imparting precipitates on the structural parts of a boiler system exposed to a demineralized aqueous medium containing scale imparting precipitates under steam generating conditions, said aqueous medium maintained at a pH of about 8–10.5 with an all volatile treatment control program using organic amines or ammonia, which minimizes magnetite solubility and prevents corrosion, an improvement for preventing the deposition of contaminants that (1) enter with the system feedwater, or (2) are produced by thermally driven changes in magnetite solubility in the feedwater, while not affecting system pH, comprising adding to the aqueous medium an effective amount for the purpose of a combination of about 0.1–500 ppm of an organic amine or ammonia and about 0.1–500 ppm of a nonionic homopolymer having the structure:

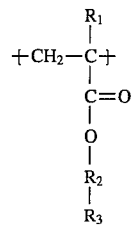

wherein $R_1$ is H or lower ($C_1$–$C_4$) alkyl, $R_2$ is ($CH_2$—$CH_2$—$O)_n$,

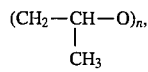

or a mixture of both, n is an integer of from 1 to about 40, and $R_3$ is H, lower ($C_1$–$C_4$) alkyl or an acetate.

2. The method of claim 1 wherein the polymer has a molecular weight (Mn) of between about 100 and 100,000.

3. The method of claim 2 wherein the polymer has a molecular weight (Mn) of between about 1,000 and 30,000.

4. The method of claim 3 wherein the polymer has a molecular weight (Mn) of between about 1,500 and 10,000.

5. The method of claim 1 wherein the organic amine is selected from the group consisting of morpholine, cyclohexylamine, piperazine, ammonia, diethylaminoethanol, dimethylisopropanolamine, dimethylamine, methoxypropylamine, ethanolamine and diethanolamine.

6. The method of claim 1 further comprising adding to the aqueous medium an oxygen scavenger.

7. The method of claim 6 wherein the oxygen scavenger is selected from the group consisting of hydrazine, hydroquinone, carbohydrazide, alkylhydroxylamines, hydroxyalkylhydroxylamines, citric acid, and ascorbic acid.

8. A method of transporting and removing contaminants including calcium, magnesium and iron found in a demineralized aqueous medium under steam generating conditions in a boiler system, said aqueous medium maintained at a pH of about 8–10.5 with an all volatile treatment control program using organic amines or ammonia, which minimizes magnetite solubility and prevents corrosion, comprising adding to the aqueous medium an effective amount for the purpose of a combination of from about 0.1–500 ppm of an organic amine or ammonia and from about 0.1–500 ppm of a nonionic homopolymer having the structure:

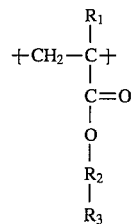

wherein $R_1$ is H or lower ($C_1$–$C_4$) alkyl, $R_2$ is ($CH_2$—$CH_2$—$O)_n$,

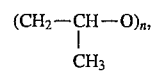

or a mixture of both, n is an integer of from 1 to about 40, and $R_3$ is H, lower ($C_1$–$C_4$) alkyl or an acetate, wherein said method does not affect system pH.

9. The method of claim 8 wherein the polymer has a molecular weight (Mn) of between about 100 and 100,000.

10. The method of claim 9 wherein the polymer has a molecular weight (Mn) of between about 1,000 and 30,000.

11. The method of claim 10 wherein the polymer has a molecular weight (Mn) of between about 1,500 and 10,000.

12. The method of claim 8 wherein the organic amine is selected from the group consisting of morpholine, cyclohexylamine, piperazine, ammonia, diethylaminoethanol, dimethylisopropanolamine, dimethylamine, methoxypropylamine, ethanolamine and diethanolamine.

13. The method of claim 8 further comprising adding to the aqueous medium an oxygen scavenger.

14. The method of claim 13 wherein the oxygen scavenger is selected from the group consisting of hydrazine, hydroquinone, carbohydrazide, alkylhydroxylamines, hydroxyalkylhydroxylamines, citric acid, and ascorbic acid.

* * * * *